United States Patent

Rich et al.

[11] Patent Number: 5,965,041
[45] Date of Patent: Oct. 12, 1999

[54] LASER WELD CHASSIS ASSEMBLY PROCESS FOR TOLERANCE NULLIFICATION

[75] Inventors: Edward L. Rich; Ross W. Bishop, both of Ogden, Utah

[73] Assignee: Iomega Corporation, Roy, Utah

[21] Appl. No.: 08/920,437

[22] Filed: Aug. 29, 1997

[51] Int. Cl.[6] .................................................. B23K 26/00
[52] U.S. Cl. ............................... 219/121.64; 219/121.82; 219/161
[58] Field of Search ..................................... 219/127, 158, 219/161, 121.63, 121.64, 121.82, 121.13, 121.14, 121.31; 360/133; 369/291

[56] References Cited

U.S. PATENT DOCUMENTS

| | | | |
|---|---|---|---|
| 4,291,218 | 9/1981 | Myhre | 219/121.82 |
| 4,461,946 | 7/1984 | Kratschmer | 219/121.63 |
| 4,617,446 | 10/1986 | Anderson | 219/121.82 |
| 4,833,295 | 5/1989 | Locker et al. | 219/121.63 |
| 4,960,973 | 10/1990 | Fouche et al. | 219/121.64 |
| 5,064,992 | 11/1991 | Jones et al. | 219/121.63 |

FOREIGN PATENT DOCUMENTS

| | | | |
|---|---|---|---|
| 267979 | 5/1988 | European Pat. Off. | 219/121.63 |
| 4004544 | 8/1991 | Germany | 219/121.63 |
| 59-19091 | 1/1984 | Japan | 219/121.64 |
| 1-233084 | 9/1989 | Japan | 219/121.64 |

*Primary Examiner*—Geoffrey S. Evans
*Attorney, Agent, or Firm*—Woodcock Washburn Kurtz Mackiewicz & Norris LLP

[57] ABSTRACT

A process for assembling a storage device such as a disk drive storage device using a laser welding technique. A welding fixture holds a storage device component in a predefined three dimensional location with a small gap relative to a second component so that improved dimensional accuracy is achieved. This welding of components that do not touch allows for assembly tolerances that are independent of component tolerances. The welding fixture can use magnetic force.

17 Claims, 7 Drawing Sheets

LASER WELD CHASSIS ASSEMBLY PROCESS FOR TOLERANCE NULLIFICATION

BACKGROUND OF THE INVENTION

This invention relates to assembly techniques for storage systems. More particularly, the invention relates to a process for the assembly of disk drive parts on a disk drive chassis.

Disk based data storage devices for storing digital electronic information have been in use in the computer industry for several decades. The storage devices operate by storing digital information on magnetic disk media, which can be either rigid or flexible and are mounted on a rotating hub. These storage devices are commonly referred to as disk drives. Disk drives come in two varieties: removable media and fixed media drives.

Removable media drives accept the disk media in the form of a removable cartridge. When the cartridge is inserted into a disk drive, a spindle motor in the drive couples with the disk hub in order to rotate the disk within the cartridge at a given speed. In fixed media drives, by contrast, the disk hub is permanently attached to the spindle motor. Disk drives typically employ either a linear actuator mechanism or a rotary actuator mechanism. The actuator positions the read/write head(s) of the disk drive on the recording surface(s) of the disk.

The general technological trend is one of shrinking component sizes. This trend also applies to the disk drive industry. For example, 2" inch disk drives (and smaller) are becoming prevalent. Correspondingly, disk components and tolerances are shrinking as well. In such drives, the relative placement of components becomes a key technical issue. For example, to ensure proper operation of the disk drive, the actuator to spindle motor placement becomes critical. Particularly with removable media disk drives, if the dimensional relationship of the actuator and spindle motor is inconsistent among drives, the drive may fail to operate reliably.

Traditionally, disk drive components such as spindle motors and actuators were attached to the drive chassis by screwing components in place, using slip rings, or snap in features. However, where the coplanarity and dimensional relationship of the components is critical, the traditional method provide insufficient precision.

Traditional welding techniques of metal components use lap joints or butt joint of metallic components. However, where the dimensional tolerances are critical the lap joint and butt joint methods may be untenable. If lap joint methods were used in such critical applications, such as the assembly of disk drives, small variations in components tolerances, such as bends and burrs in the metal components that occurs during stamping, may be enough to cause tolerance problems in the finished disk drive. The dimensional tolerance problems would eventually prevent further technological advances due to the reduction of drive components and drive size. Moreover, to account for the component tolerance variations, the components themselves would have to meet extreme tolerances. As a result of the extreme component tolerances that would be necessary, the cost of components would ultimately drive up the drive cost.

The extreme component tolerances and higher drive costs could be circumvented by an improved assembly process. Thus there is a need for an improved economical assembly process of storage devices that improves dimensional relationships of components.

SUMMARY OF THE INVENTION

The present invention meets the above need by providing a process for assembling a storage device. The process comprises the steps of positioning a first storage device component proximate a second storage device component such that a gap remains between the first and second components. The components are then welded so that a portion of at least one of said first component and said second component puddles into the gap such that said first component is joined to the second component.

In the assembly process the positioning of the first and second components comprises the use of a welding fixture that holds the first component in a predefined three dimensional location relative to the second component.

The assembly process has broad application across a range of data storage devices and components. But preferably the components comprises ones having a critical dimensional relationship such as a chassis, a motor, and a transducer.

The welding can be performed with a variety of welders having a high energy density radiation beam. Preferably, the radiation beam comprises a laser beam, such as one produced by a laser welder.

The welding of the components can be performed along the radial edges of the components. Or alternatively, the components can be provided with radially extending tabs that permit tangential welding. In such a case, the welding is performed on a side portion of the tabs.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 2A is a top plan view of a partially assembled disk drive chassis;

DETAILED DESCRIPTION OF PREFERRED EMBODIMENT

The present invention provides a process for assembling components in three dimensional space using a welding process. Throughout the description, a preferred embodiment of the invention is described in connection with the assembly of disk drive components, such as a chassis, a spindle motor, and an actuator. However, the components shown only illustrate the operation of the present invention and are not intended as limitations. For example, the invention is equally applicable to the assembly of other storage media systems and such as tape drives where highly accurate spacial relationships are required. Accordingly, the invention should not be limited to the embodiment shown.

Figure 1:
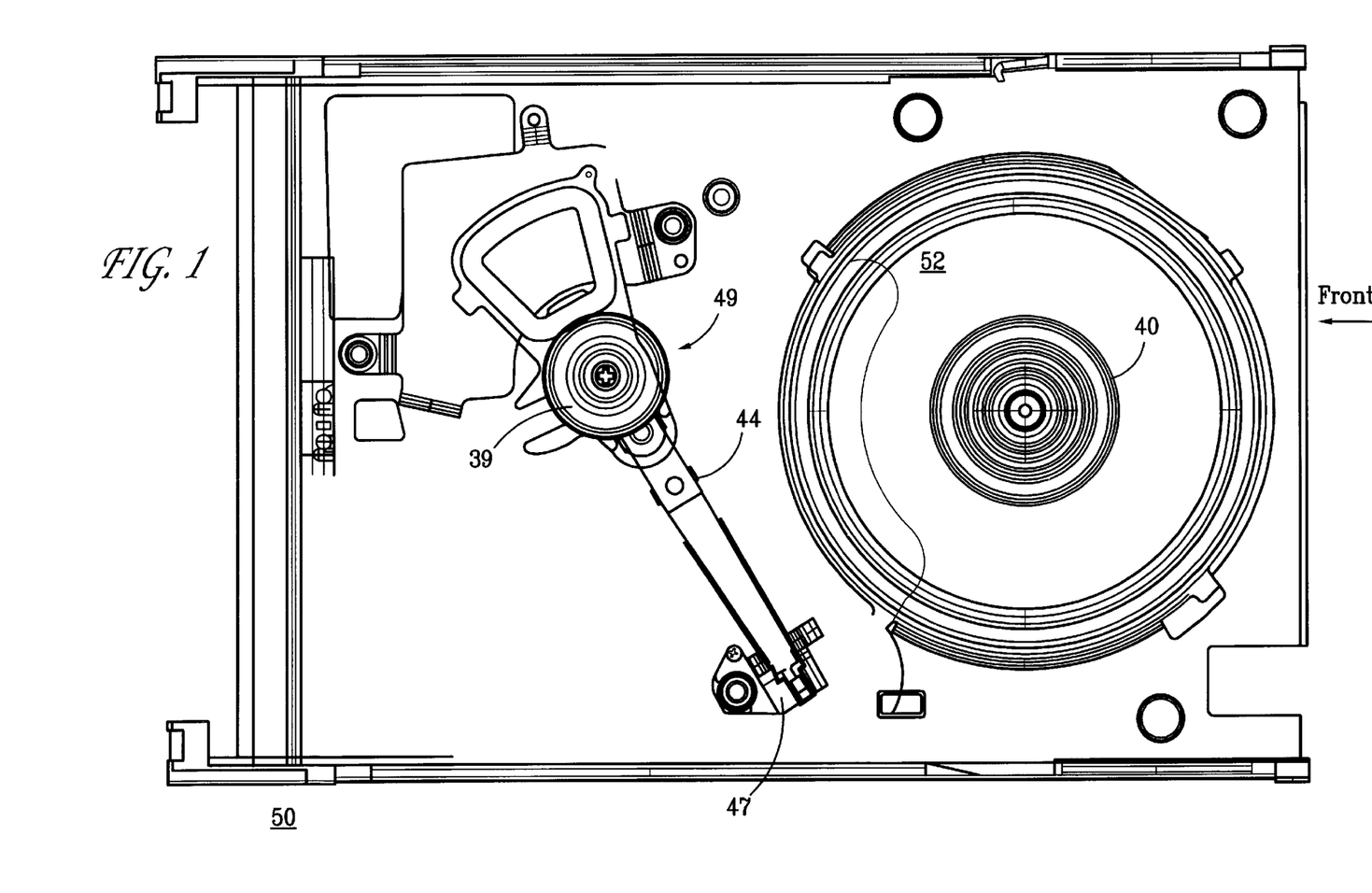
FIG. 1 is a top plan view of a partially assembled disk drive.

FIG. 1 is a top view of the internal components of disk drive 50. Drive 50 comprises a chassis 57, an actuator 49, a spindle motor 52 and a spindle 40. Spindle 40 is magnetically sensitized to couple with a metallic hub on a disk cartridge. The actuator is itself comprised of four major components: (1) a pair of load beams 44 with (2) a read/write head 47 disposed at the end of each beam, (3) a coil 43, and a bearing assembly 39. A disk cartridge (not shown) can be inserted into the front of drive 50 in the direction indicated by the arrow. During insertion, the cartridge slides linearly along the top surface of chassis 57 and spindle motor 52 for engagement with the read/write heads 46. A system for disk cartridge hub engagement with the drive is described more fully in copending patent application Ser. No. 08/920932 entitled "MEDIA HUB MOUNTING SYSTEM FOR MINIMIZING Z-AXIS TRANSLATION" filed Aug. 29, 1997, which is hereby incorporated by reference in its entirety.

The various components used in the disk drive have critical spacial requirements. For example, when a disk is inserted into drive 50, spindle 40 engages the hub of the disk. Thereafter, actuator 49 moves over the surface of the disk reading and writing data. Critically, if alignment between the actuator 49 and spindle 40 does not meet critical tolerance, reliability problems will arise. In particular, a disk written in a first drive 50 may not be readable in a second drive 50 and vice versa, or a disk drive may not operate at all. Additionally, if high positional tolerances of drive components can be consistently maintained, smaller drives and drives capable of storing higher data capacities can be manufactured.

Figure 2A:
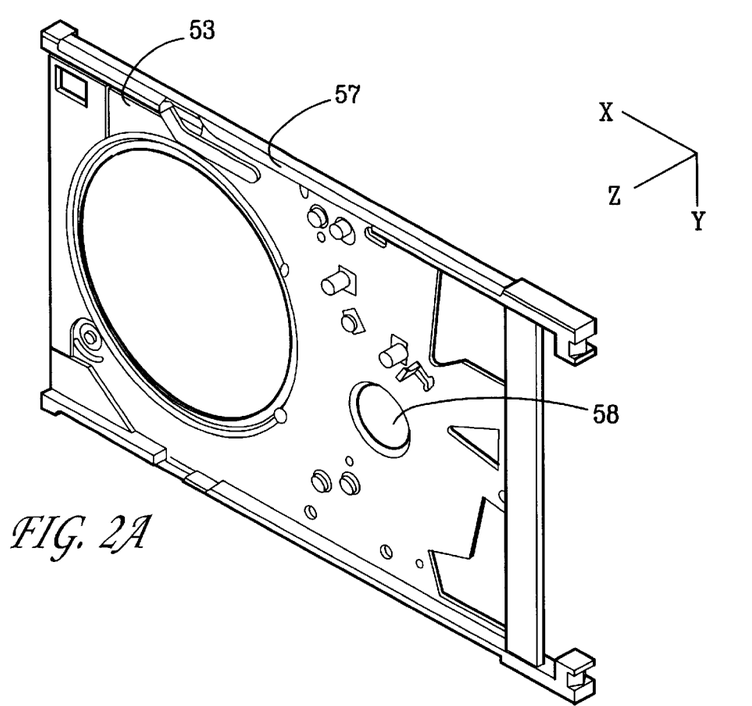
FIG. 2A is an isometric view of a disk drive chassis.

FIG. 2A shows an isometric view of chassis 57 to which drive components are attached during assembly of the drive shown in FIG. 1. Chassis 57 comprises a metal such as steel and is formed by stamping or milling. Surface mounting features are provided on chassis 57 for component attachment. For example, chassis 57 has motor mount opening 53, which is a point of attachment for spindle motor 52, and actuator mount opening 58, which is a point of attachment for actuator 49. Additionally, the dimensions of chassis 57 are relatively small compared to common drive sizes. For example, chassis 57 is about 3¼" long by about 2" wide.

Figure 2B:
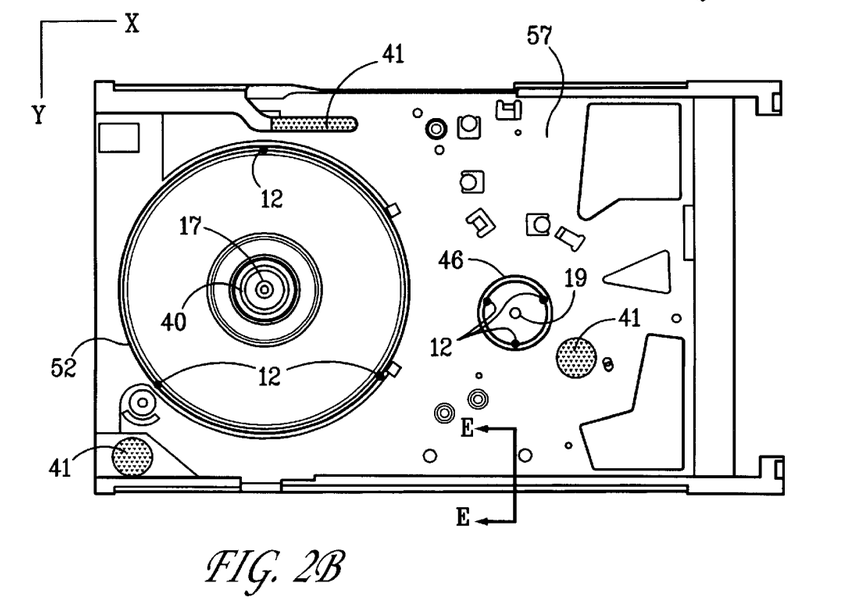

FIG. 2B shows a top plan view of chassis 57 under partial assembly. The assembly comprises chassis 57, spindle motor 52, and an actuator pivot mount 46. The actuator pivot mount is the base to which a final actuator assembly (as shown in FIG. 1) is attached. The selected components (chassis 57, spindle motor 52, and actuator pivot mount 46) are shown merely to illustrate the invention, which is applicable to the assembly of other drive components. Each of the components (spindle motor 52 and actuator pivot mount 46) are welded into place on chassis 57 at three points 12. Motor 52 has a center point 17 and actuator pivot mount 46 has a pivot point 19. The distance between the two points is on the order of about 1". Because the two components 52, 46 co-operate to make the drive function properly, exacting tolerances in spacial relationship between the two components 52, 46 must be maintained. These tolerances must be maintained in all dimensions (x, y, z).

Figure 3A:
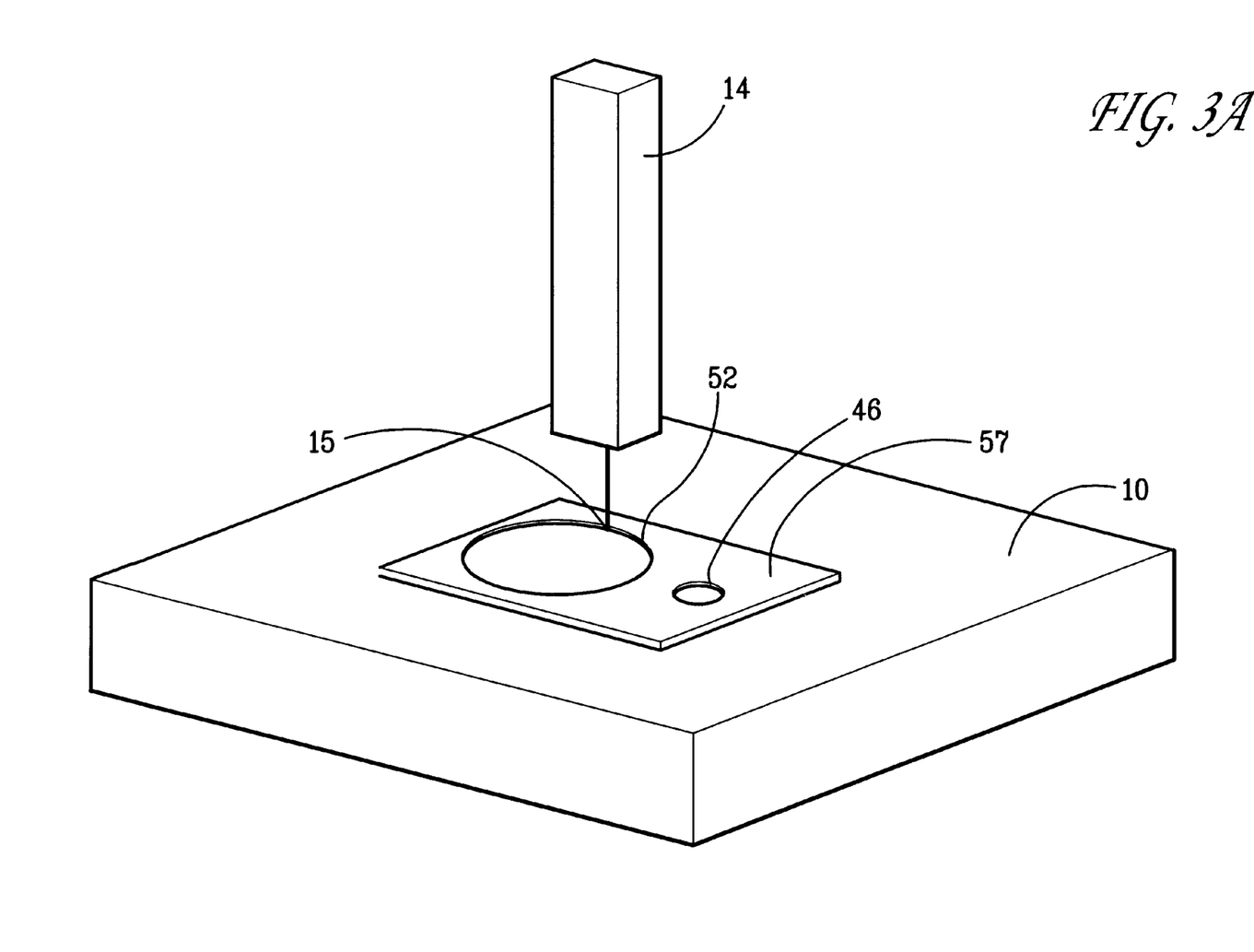
FIG. 3A is an isometric view of the fixture assembly and process used in assembling disk drive components.
Figure 3B:
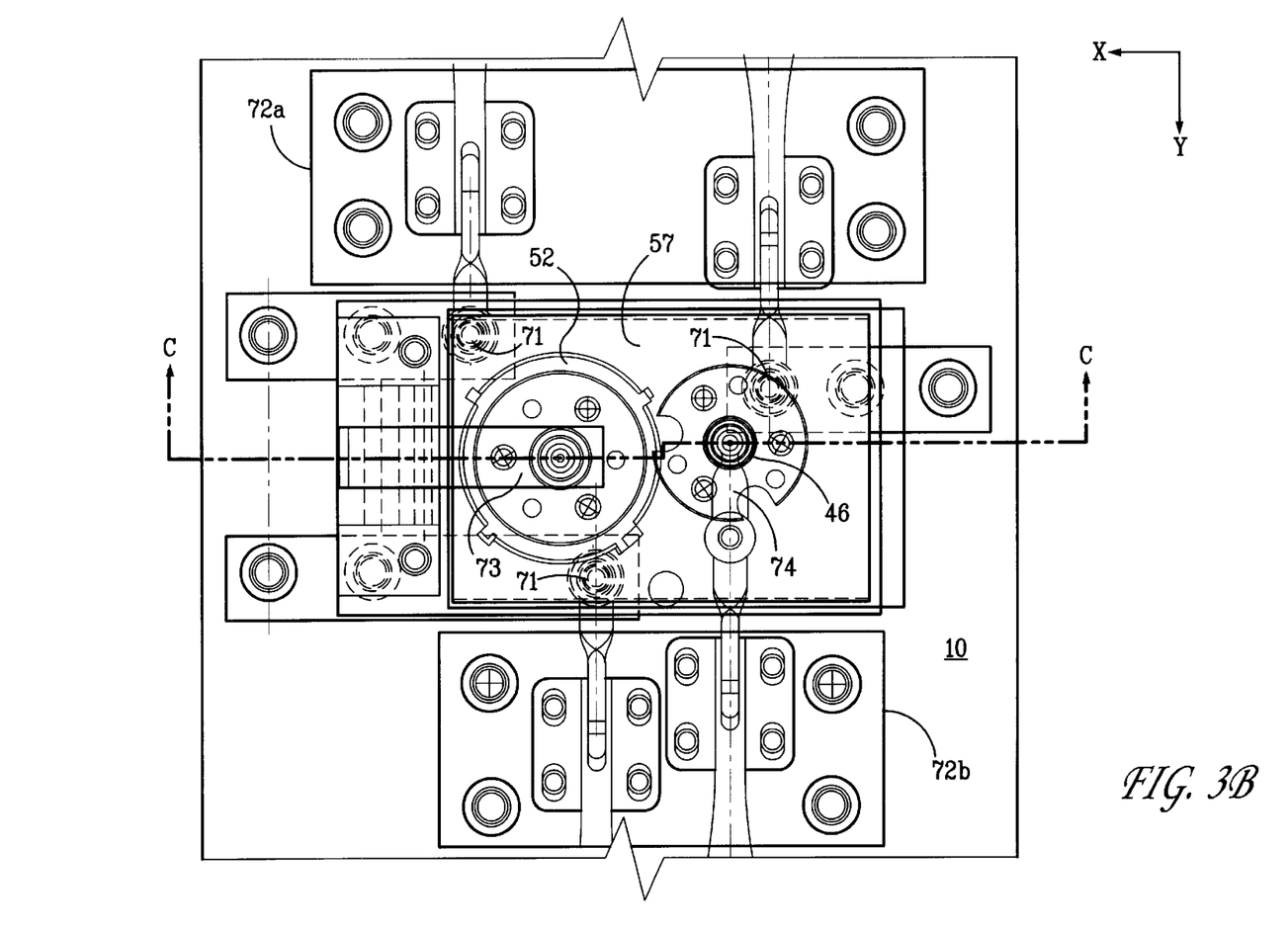
FIG. 3B is a top plan view of the fixture assembly and process used in assembling disk drive components.
Figure 3C:
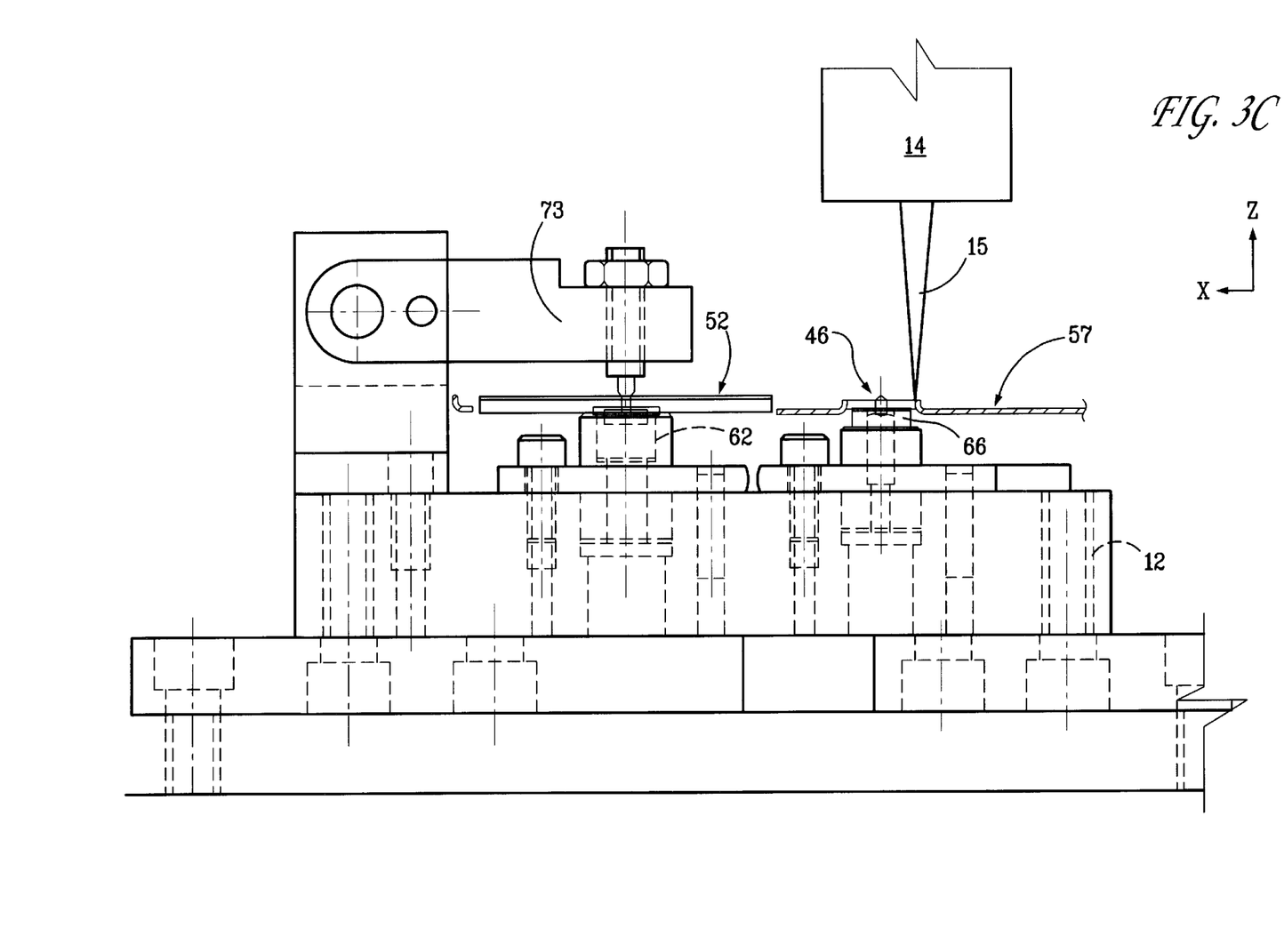
FIG. 3C is a side plan view of the fixture assembly and process used in assembling disk drive components.
Figure 3D:
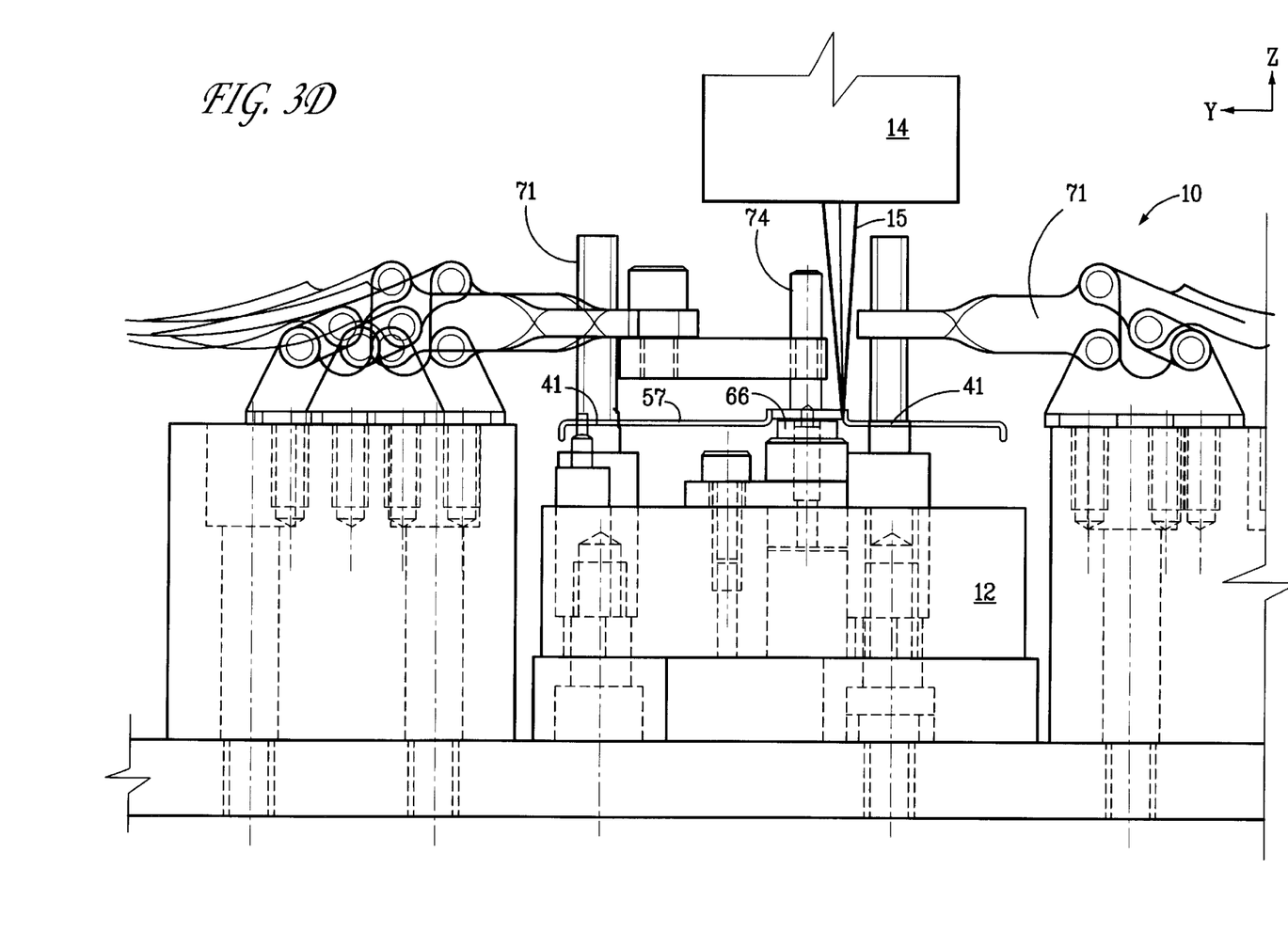
FIG. 3D is a front plan view of the fixture assembly and process used in assembling disk drive components.

FIG. 3A shows the process of assembly of the components to chassis 57. The assembly tooling comprises a laser 14 that provides a high energy radiation beam 15, such as a laser beam. Preferably, welder 14 comprises a RSY 500P Laser Welder, which is available from Rofin-Sinar, Inc., Plymouth, Mich. Additionally, the assembly tooling comprises a fixture 10 that hold the components in a predefined dimensional relationship during welding. FIGS. 3B through 3D present top, cut-away side, and front views, respectively, of a chassis 57 under assembly in accordance with the present invention.

FIG. 3B shows the x, y dimensional relationship of the components 46, 52 in chassis 57. Chassis 57 has been placed over components 46 and 52 in fixture 10 between two clamps 72a and 72b. The clamps 72a and 72b hold chassis 57 fixed in space at three clamping points (see also points 41 in FIG. 2B) by clamp jaws 71. As described more fully below, after the chassis 57, actuator pivot base 46, and spindle motor 52 are fixed in the predefined three dimensional relationship, laser 14 welds the components into place locking them in place.

FIG. 3C is a cut-away side view of the chassis assembly along the line C—C of FIG. 3B. As shown in conjunction with FIG. 3D, fixture 10 further comprises a base 12 that has datum points 62 and 66 that hold spindle motor 52 and actuator pivot base 46, respectively, in proper z-axis relationship, as well as x and y-axis relationship. Motor 52 is clamped into position by clamp 73. And, actuator pivot base 46 is clamped into position by clamp 74 (not shown in FIG. 3C for clarity).

The process of assembly is best described with reference to FIGS. 3A–3C. Spindle motor 52 is clamped into fixture 10 relative to actuator pivot base 46. The clamping of motor 52 can be either mechanical or magnetic. Preferably, magnetic clamping means is employed using the magnetic force of spindle 40. The components 52, 46 are referenced by the fixture datum points 62 and 66 in x, y, z and parallel space to the precise dimensions of the fixture. After the components 52, 46 are fixtured, chassis 57 is slipped over the components and is reference in the z-axis by the three clamping points 41. Significantly, chassis 57 is referenced in the x and y-axis by clearance between the chassis openings (53, and 58 of FIG. 2A) and components 52,46. That is, motor mount opening 53 is sized to have a gap between it and the motor, and actuator mount opening 58 is sized to have a gap between it and the actuator pivot base 46. As a result of the gaps, chassis 57 can be aligned independent of components 52, 46. The independent alignment of chassis 57 ensures that burrs and edges on the mount openings 53, 58 will not cause misalignment of components 52, 46. Chassis 57 is thus positioned in x, y, and parallel space relative to the components 52, 46. Because there is no interference between chassis 57, spindle motor 52, and actuator pivot base 46, they do not influence each other in there respective dimensional positioning.

After chassis 57 is clamped over components 52, 46, all of the welds are made yielding a very accurate assembly. Welder 14 welds components 52, 46 to chassis 57 at three points. At each weld point, the weld is made by melting portions of the component to be welded and the mount opening. Because the clearances between the mount opening and the component are small, the weld pool is small, resulting in negligible shrinkage.

Figure 4:
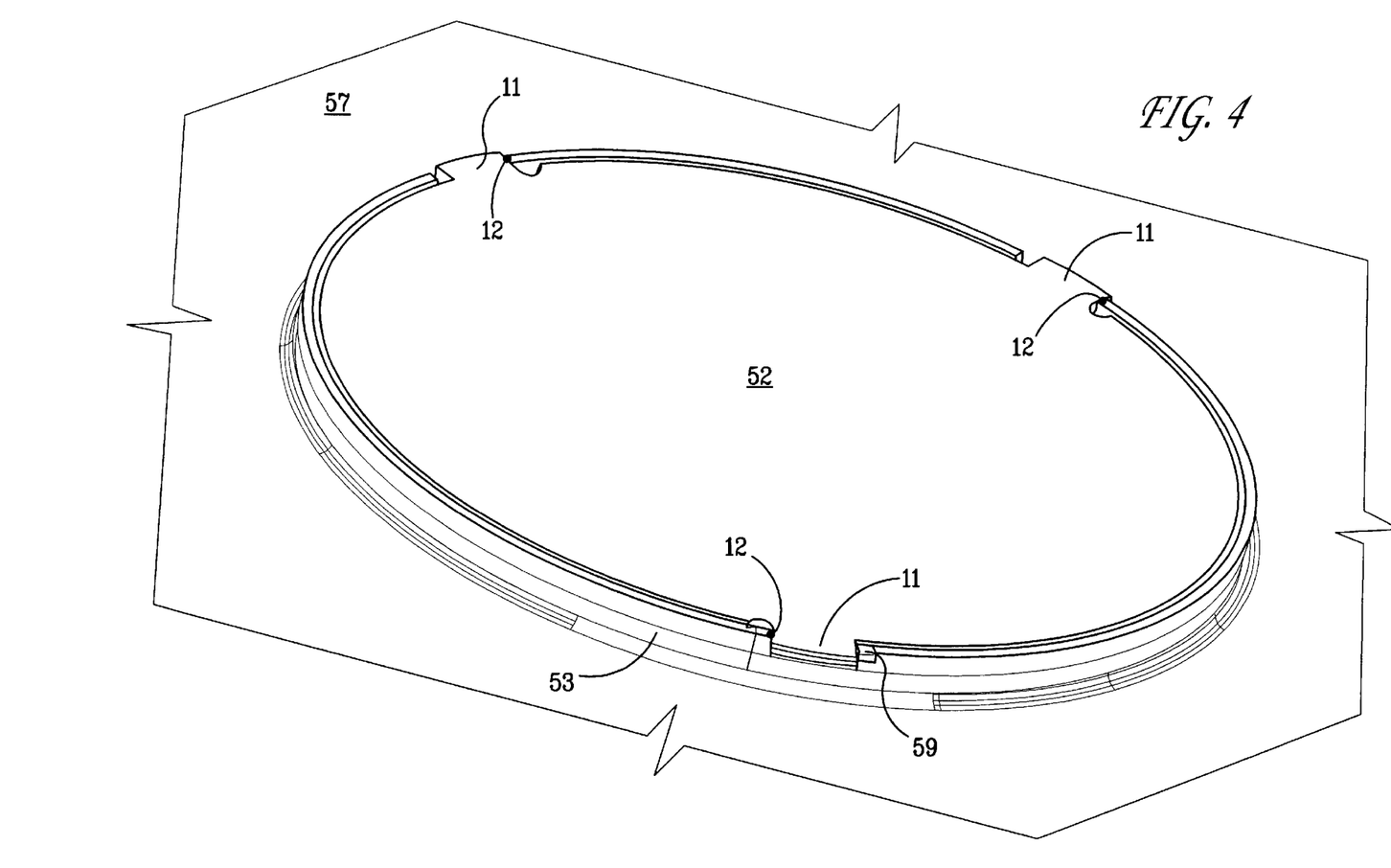
FIG. 4 is an exemplary tangential weld of a component into a chassis.

The weld can be performed along the radial edges of components 52, 46 in the gap with mounting openings 53, 58. Alternatively, a tangential weld can be performed as illustrated in FIG. 4. In that Figure a component, such as spindle motor 52, is in weld alignment with chassis 57. The component 52 used in according to the tangential weld of the present invention preferably comprises weld tabs 11 that aid in the alignment and welding. Mount opening 53 comprises alignment cut-outs 59 that mate with tabs 11 to aid in alignment of the component. Weld points 12 are made along the sides of tabs 11 to sides of cut-outs 59. This tangential weld point is preferred to a radial weld point to minimize stress in the completed weld.

The above description of preferred embodiments is not intended to impliedly limit the scope of protection of the following claims. Thus, for example, except where they are expressly so limited, the following claims are not limited to applications involving disk drive systems.

What is claimed is:

1. A process for assembling a storage device, comprising the steps of:

positioning a first storage device component proximate a second storage device component such that a gap remains between the first and second components;

welding said first component to said second component so that a portion of at least one of said first component and said second component puddles into the gap such that said first component is joined to said second component.

2. The process as recited in claim 1 wherein the step of positioning said first and second components comprises the use of a welding fixture that holds said first component in a predefined three dimensional location relative to said second component.

3. The process as recited in claim 1 wherein said first component comprises one of a chassis, a motor, and a transducer.

4. The process as recited in claim 1 wherein said second component comprises one of a chassis, a motor, and a transducer.

5. The process as recited in claim 1 wherein said welding step comprises the use of a high energy density radiation beam.

6. The process as recited in claim 6 wherein said radiation beam comprises a laser beam.

7. A process for assembling a first component in relation to a second component in three-dimensional space, comprising the steps of:

fixing a chassis in space, said chassis having a first mounting opening for said first component and a second mounting opening for said second component;

positioning said first and second components in the mounting openings so that the position of said first component relative to said second component is within a predefined positional tolerance, and wherein at least one of said first and said second components is positioned in the mounting opening so that there is no contact between the component and the chassis; and, welding said first component and said second component to said chassis.

8. The process as recited in claim 7 wherein the step of welding comprises the use of a high-energy density radiation beam.

9. The process as recited in claim 8 wherein said high energy-density radiation beam comprises a laser beam.

10. The process as recited in claim 7 wherein the step of welding further comprises the step of welding the components to said chassis at three points.

11. A process for assembling a disk drive having a plurality of components, comprising the steps of:

fixing a first component in three dimensional space;

positioning a second component in predefined three dimensional space relative to said first component;

positioning a chassis proximate said first and said second component so that the spacial relationship between first component, the second component, wherein predefined dimensional tolerances are maintained and wherein the positioning of said chassis does not effect the positions of the first component and the second component;

welding said components to said chassis using a high energy radiation beam.

12. The process as recited in claim 11 wherein said fixing of said first component comprises the step of clamping said first component.

13. The process as recited in claim 11 wherein said positioning of said second component comprises the step of clamping said second component.

14. The process as recited in claim 13 wherein said clamping comprises the use of magnetic force.

15. The process as recited in claim 11 wherein said high energy radiation beam comprises a laser beam.

16. The process as recited in claim 11 wherein said step of welding comprises welding at least one of said first component and second component at radial points along an outer edge of said component.

17. The process as recited in claim 11 wherein said step of welding comprises welding at least one of said first component and said second component at tangential points along an outer edge of said component.

* * * * *